United States Patent [19]

Leeds et al.

[11] 4,314,451
[45] Feb. 9, 1982

[54] CONTROLLING TEMPERATURE OF A CRYOGENICALLY REFRIGERATED PRODUCT

[75] Inventors: Richard L. Leeds, Metuchen; Jeffrey A. Montross, Bloomfield, both of N.J.; Richard J. Barbini, Islip Terrace, N.Y.

[73] Assignee: Airco, Inc., Montvale, N.J.

[21] Appl. No.: 200,626

[22] Filed: Oct. 27, 1980

[51] Int. Cl.$^3$ ............................................. F25C 1/18
[52] U.S. Cl. ........................................ 62/68; 62/136; 62/230; 62/342; 62/384
[58] Field of Search ................... 62/66, 68, 76, 136, 62/215, 230, 342, 343, 384; 366/40

[56] References Cited

U.S. PATENT DOCUMENTS

| | | | |
|---|---|---|---|
| 3,593,966 | 7/1971 | Munroe | 366/40 |
| 3,698,203 | 10/1972 | Stoelting | 62/136 |
| 3,719,056 | 3/1973 | Hock et al. | 62/136 |
| 4,275,567 | 6/1981 | Schwitters | 62/68 |

Primary Examiner—Ronald C. Capossela
Attorney, Agent, or Firm—David L. Rae; Larry R. Cassett

[57] ABSTRACT

The temperature of a product which is being chilled in a blender by introducing carbon dioxide in solid and gaseous form into the blender is controlled by sensing the power drawn by the drive motor coupled to the impeller. The power drawn by the motor is sensed and analyzed and, upon reaching a predetermined value, the introduction of $CO_2$ into the blender is terminated. As the product is chilled by contact with $CO_2$ in the blender, the viscosity of the product will increase, which in turn, increases the power drawn by the motor. Variations in line voltage supplied to the motor and changes of the initial temperature of the product being chilled do not affect the final temperature to which the product may be accurately chilled.

7 Claims, 1 Drawing Figure

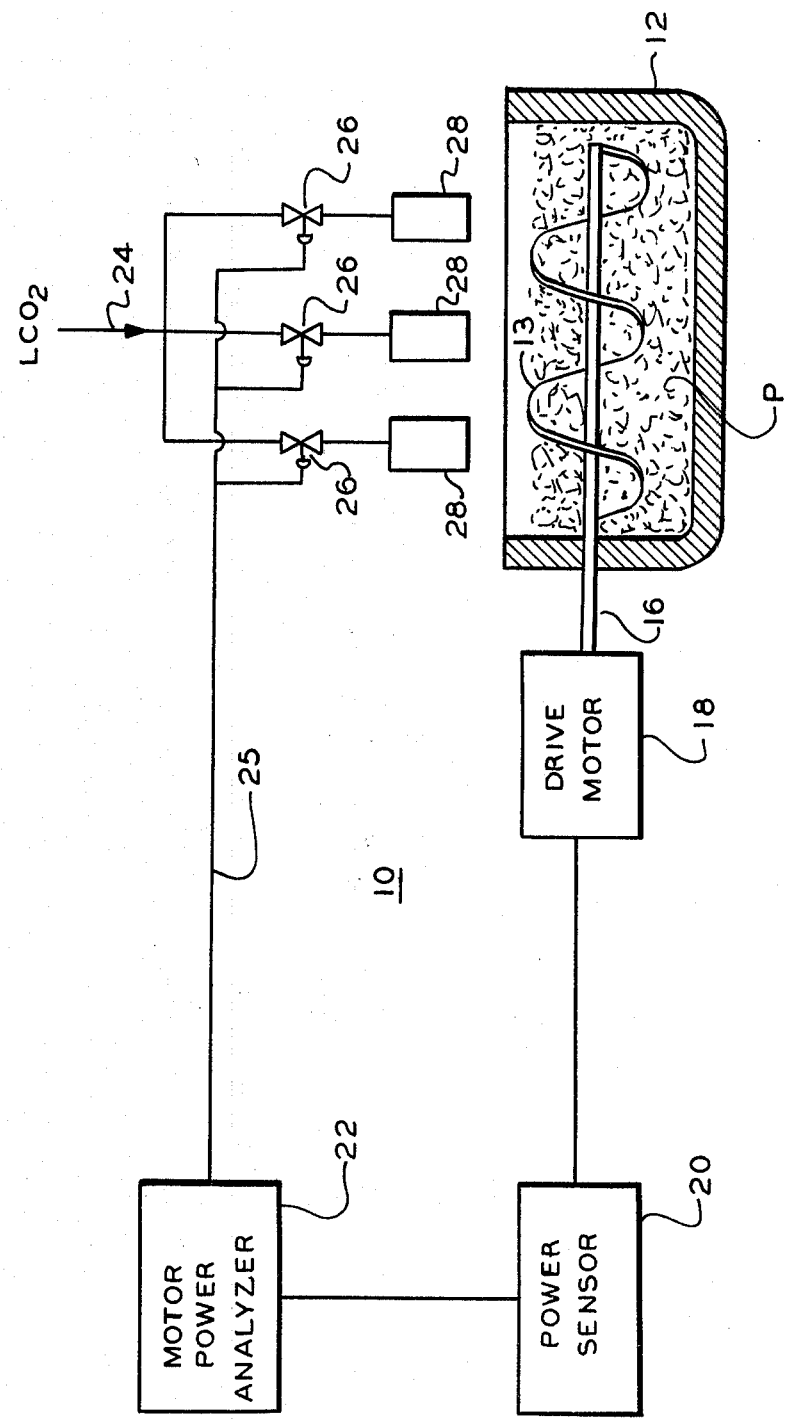

CONTROLLING TEMPERATURE OF A CRYOGENICALLY REFRIGERATED PRODUCT

BACKGROUND OF THE INVENTION

The present invention relates to improved methods and apparatus for controlling the temperature of a product and, more particularly, to methods and apparatus to which a viscous food product is chilled with $CO_2$.

In the course of processing certain products such as ground beef or cut chicken, it is frequently necessary to chill such products to a desired temperature. Typically, chilling is required to enable formation of such products in particular shapes, e.g. a hamburger, which may be then frozen prior to shipment to a restaurant or the like. It is known to chill ground beef, for example, in a blender by adding a refrigerant to the blender, such that the mixture of the beef and refrigerant by an impeller causes the beef to be chilled to a temperature, typically on the order of 30° F. Although the actual temperature of such ground beef can be sensed by one or more temperature measuring instruments disposed in the blender, such a technique requires careful placement of these instruments and only yields point source temperature indications and many times, does not provide an indication of the overall beef temperature. Thus, although a temperature of 30° F. may be indicated by one instrument, other locations in the blender may not be experiencing the same temperature and thus, the beef product may not be uniformly chilled to this temperature. Typically, a refrigerant such as $CO_2$ is added to a blender at a predetermined flow rate for a given interval of time, which is set in response to the normal initial temperature of the beef and the total weight thereof in the blender. However, as the initial temperature of the beef and the fat content thereof may vary from average values, simply introducing $CO_2$ into the blender for a predetermined time interval under the control of a timer does not assure that a desired final temperature of the beef will exist at the end of such time interval. For example, if the initial temperature of the beef is higher than average, the final temperature will likewise be above a desired value and, it the initial beef temperature is lower than an assumed value, the final temperature thereof will also be lower, which in turn requires that the processor must wait for the batch of chilled beef to warm up so that further processing steps, such as forming hamburger patties, or the like, may be conducted. Such delays, of course, reduce the through-put of the overall meat processing plant and also entail unnecessary consumption of $CO_2$.

In previously known systems wherein the flow of $CO_2$ is controlled by means of a timer, as described above, liquid $CO_2$ is caused to flow through a control valve and is emitted into a blender from a "snow horn" or other suitable devices as solid and gaseous $CO_2$. As the pressure in a liquid $CO_2$ storage vessel decreases, the actual solid $CO_2$ delivered to the blender will be reduced and consequently, in a given time interval, less refrigeration is provided to the blender than would be provided, were the liquid $CO_2$ pressure to remain constant. Thus, simply using a timer to control the flow of $CO_2$ to a blender frequently results in inaccurate amounts of this refrigerant being supplied, which in turn results in frequent failure to bring the beef, or other product, to a desired temperature at the end of a time interval set by the timer device. Although thermometers or other temperature indicating instruments may be utilized to check the temperature of beef at the end of a time interval in a blender, it is not unknown for operators to mistakenly leave such instruments in the batch, which error may result in the loss of an entire batch of beef product.

It is also known in the prior art to control the supply of a refrigerant which passes in heat exchange relation to a substance being refrigerated by effectively detecting the viscosity of the substance being chilled, as illustrated in U.S. Pat. No. 3,108,449. In the system described in this reference a mechanical coupling is caused to slip when the viscosity of a water-ice mixture exceeds a predetermined value, thereby indicating incipient freezing. Upon this slippage, a switch is de-activated, thereby terminating the supply of refrigerant previously passed through coils in indirect heat exchange relation to the liquid being chilled. Although the refrigeration of this liquid is not dependent on the initial temperature thereof, this prior art system utilizes relatively unreliable mechanical elements such as couplings and springs, which are subject to failure, and the drive motor utilized in this system is still subject to line voltage fluctuations which would cause slippage of the coupling element at instances which do not accurately reflect the viscosity, and hence temperature, of the liquid being refrigerated. In addition, although the flow or refrigerant through the coils is terminated, the refrigerant remaining in the coils continues to supply transient refrigeration to the water-ice product which, in turn, tends to reduce the temperature and viscosity below a predetermined level.

Accordingly, a clear need exists for a blender chilling system utilizing $CO_2$ as a refrigerant and which can be controlled to accurately chill batches of products to desired temperatures, notwithstanding variations in the initial product temperature, composition, or fluctuations in line voltages.

OBJECTS

It is an object of the present invention to provide improved methods and apparatus for chilling products to desired temperatures.

It is also an object of the present invention to provide improved methods and apparatus for accurately chilling products to desired temperatures with the use of $CO_2$ as a refrigerant.

It is a further object of the present invention to provide methods and apparatus for reducing losses of products as a result of improperly chilling such products.

It is another object of the present invention to provide methods and apparatus for reducing losses of expendable refrigerants in chilling products to a desired temperature in a blending device.

Other objects of the present invention will become apparent from the following description of exemplary embodiments thereof which follows and the novel features will be particularly pointed out in conjunction with the claims appended hereto.

SUMMARY

In accordance with the present invention, products are chilled to a desired temperature in a blender, having a motor driven impeller, by introducing $CO_2$ snow into the blender, energizing the impeller to mix said snow and product to thereby chill the product and increase the viscosity thereof, sensing the electrical power drawn by the motor and terminating introduction of $CO_2$ snow when the power drawn exceeds a predetermined value. The temperature of the product in the blender will correspond to a particular viscosity, which in turn presents a load on the impeller driven by the electrical motor. Thus, when the power actually drawn by the motor reaches a predetermined value, such value will indicate that the product viscosity and temperature are at a desired level and this indication is independent of the initial product temperature and any fluctuation of line voltage. The product to be chilled is preferably a food product such as ground beef, diced chicken or chili mix, although other products such as plastic materials which exhibit inverse temperature and viscosity relationships may be chilled.

The blender preferred in accordance with the invention is typically a container having one or more motor driven impellers mounted for rotation therein. The impellers may be comprised of a plurality of paddle-like elements or blades mounted on a shaft or may comprise a screw-type mixing device. The flow of product and $CO_2$ snow in the blender during mixing will be laminar and thus, the viscosity of the product may be calibrated against power drawn as determined by product temperature. As a result of thorough mixing of the product and $CO_2$ snow, the final temperature can be determined by sensing product viscosity, which is detected by analyzing the power drawn by the impeller motor, as mentioned above. Other problems associated with prior art systems such as changes in final temperature occasioned by varying product composition or initial temperature, and problems associated with leaving temperature indicating devices in a blender are obviated by the method and apparatus according to the present invention.

BRIEF DESCRIPTION OF THE DRAWING

The invention will be more clearly understood by reference to the following description of exemplary embodiments thereof, in conjunction with the following drawings in which:

The sole FIGURE is a diagrammatic view of apparatus for controlling the temperature of products being refrigerated with $CO_2$ in a blender.

DESCRIPTION OF PREFERRED EMBODIMENT

Referring now to the drawing, illustrated therein is an exemplary embodiment of apparatus 10 for chilling a product P in accordance with the invention. Apparatus 10 is generally comprised of a blender 12, drive and power analyzing means, and means for supplying carbon dioxide ($CO_2$) to blender 12. The products to be chilled in accordance with the invention are preferably food products such as ground beef or pork, diced or ground chicken, chili mix, etc. although other non-food products may be chilled as well. It is important that the viscosity of a batch of products to be chilled increase with decreased temperature.

Returning now to the drawing, blender 12 may take the form of a commercially available device having an impeller 13 mounted for rotation therein. Typically, impeller 13 is a screw type mixing device which is effective to mix together materials introduced into blender 12, which for example, may be of a size capable of processing 2,000 lb batches of ground beef. Impeller 13 is coupled by means of shaft 16 to drive motor 18, which may comprise a conventional electrical motor. Power sensing means 20 is coupled to drive motor 18 and to motor power analyzer means 22. Power sensing means 20 and analyzer means 22 are available commercially from Rexnord Instrument Products, Malvern, Pa., under Model No. 2340 and preferably analyzer means 22 will include control circuitry, the latter being commercially available from the assignee of the present invention under Model No. D1-28-6121. Motor power analyzer means 22 is electrically connected by line 25 to control valves 26 which, as those skilled in the art will appreciate, are adapted to open or close in response to electrical signals supplied thereto over line 25. Liquid $CO_2$ is supplied through line 24 from a suitable receiver or storage vessel (not shown) through valves 26 and through dispensing means 28 into blender 12. Dispensing means 28 may comprise conventional "snow horns". As those skilled in the art will appreciate, liquid $CO_2$ must be maintained under a pressure of at least 60.4 p.s.i.g. to retain it in the liquid phase and when released to a lower pressure, liquid $CO_2$ expands or flashes to its solid and vapor phases with the solid phase being generally referred to as $CO_2$ snow. When liquid $CO_2$ is released to ambient, $CO_2$ snow and vapor are formed at a temperature of $-109°$ F. Commonly, liquid $CO_2$ is maintained under a pressure of about 300 p.s.i.g. in a receiver, although upon withdrawal from a receiver, the remaining liquid $CO_2$ may undergo a pressure reduction. The significance of such pressure reduction will be subsequently discussed.

In operation of apparatus 10, a batch of a product P is introduced into blender 12. Liquid $CO_2$ is supplied through line 24, control valves 26 and dispensing means 28 and enters blender 12 as a snow-gas mixture. A hood and exhaust device (not shown) is disposed to remove $CO_2$ gas from blender 12 to avoid $CO_2$ buildup in the immediately surrounding atmosphere. Drive motor 18 is activated and is effective to rotate shaft 16 and impeller 13 which mixes $CO_2$ snow and product P. This mixing causes the product temperature to decrease and sublimation of the $CO_2$ snow, with the resulting $CO_2$ gas being exhausted, as mentioned above. It will be understood that any one or more of control valves 26 will open in response to particular electrical signals supplied over line 25 by the control circuitry of analyzer means 22. Depending on the weight of product P in blender 12, one or more of control valves 26 will open to supply liquid $CO_2$ to corresponding dispensing means 28.

As the temperature of product P decreases as a result of direct contact between $CO_2$ snow and product P, i.e. direct heat exchange, the viscosity of product P increases, which increases the load on drive motor 18. This in turn causes an increase in the electrical power drawn and the increased power draw is detected by power sensing means 20 which may, for example, sense the difference between the actual and synchronous speeds of drive motor 18 and supply an electrical signal representative of such difference. Motor power analyzer means 22 receives the output signal supplied by sensor 20 and compares the actual power draw of drive motor 18 to a predetermined power draw. Upon the actual power drawn by drive motor 18 reaching the predetermined value, analyzer means 22 is effective to supply a signal over line 25 to control valves 26 to close these valves and terminate the supply of liquid $CO_2$ to dispensing means 28 to thereby terminate the introduction of $CO_2$ snow into blender 12.

It will be understood that motor power analyzer means 22 is calibrated such that a predetermined power level will correspond to a desired, final temperature of product P in blender 12. This calibration may be effected by carefully sensing the temperature of product P as $CO_2$ snow is mixed therewith and observing the actual draw indicated by motor power analyzer means 22 or by another suitable power indicating device. Once motor power analyzer means 22 is calibrated for a given product P, such as ground beef, upon chilling subsequent batches of product P, apparatus 10 will operate to terminate the supply of $CO_2$ snow to blender 12 when a desired final temperature of product P is reached, regardless of variations in, for example, the fat content or initial temperature of such beef from one batch to another.

A further benefit provided by the present invention is that fluctuations in line voltage will not cause erroneous termination of the supply of liquid $CO_2$ to dispensing means 28. That is, in the event the line voltage supplied to drive motor 18 increases or decreases, motor power analyzer means 22 will compensate for this variation. As mentioned previously, by sensing the shaft speed of impeller 13, voltage is not relied upon in order to analyze power drawn by motor 18. Thus, the power draw will remain virtually constant regardless of line voltage changes and it is essentially only changes in the viscosity of product P (which is inversely related to the temperature thereof) which will alter the power actually drawn.

As mentioned previously, the removal of liquid $CO_2$ from a pressurized receiver or storage vessel may result in a pressure reduction therein, which has the effect of altering the portion of liquid $CO_2$ converted to $CO_2$ snow. At lower pressures, a smaller amount of liquid is allowed to flow and, with a timer-controlled chilling system, as mentioned above, less $CO_2$ snow (i.e. refrigeration) than is desired will be delivered to blender 12 in a pre-set time interval. This will result in product P being brought down to a higher than desired temperature and frequently requires that the batch of product P be additionally chilled, thereby delaying further processing.

The foregoing and other various changes in form and details may be made without departing from the spirit and scope of the present invention. Consequently, it is intended that the appended claims be interpreted as including all such changes and modifications.

What is claimed is:

1. A method for controlling the temperature to which a product is chilled in a blender having a rotatable impeller adapted to be driven by an electric motor comprising the steps of introducing solid $CO_2$ into said blender and into contact with said product; energizing said motor to drive said impeller, thereby mixing said solid $CO_2$ with said product to chill the same, the improvement comprising the steps of:

sensing the electrical power drawn by said motor; comparing the sensed power with a predetermined power value and terminating the introduction of solid $CO_2$ into the blender upon the actual power drawn by said motor reaching said predetermined value.

2. The method defined in claim 1, wherein said product is comprised of ground beef.

3. The method defined in claim 1 wherein said product is comprised of ground or diced chicken.

4. The method defined in claim 1, wherein the step of introducing solid $CO_2$ comprises passing liquid $CO_2$ under pressure through a dispensing device to convert said liquid $CO_2$ to solid gaseous $CO_2$ and directing said solid and gaseous $CO_2$ into contact with said product.

5. The method defined in claim 4, wherein the step of terminating said introduction of solid $CO_2$ comprises terminating the flow of liquid $CO_2$ to said dispensing device.

6. A method for controlling the temperature to which a product is chilled in a blender having a rotatable impeller adapted to be driven by an electric motor comprising the steps of selecting a predetermined temperature to which a batch of said product is to be chilled; introducing solid $CO_2$ into said blender and into contact with said product; energizing said motor to mix said solid $CO_2$ and said product together to thereby chill said product; sensing the actual temperature of said product and sensing the actual power drawn by said motor when the actual temperature of said product is reduced to said selected temperature, whereby said sensed power drawn at the selected temperature constitutes a predetermined power draw level; terminating introduction of solid $CO_2$ upon sensing said selected temperature; removing said batch chilled to said selected temperature from said blender; introducing a further batch of said product and solid $CO_2$ into said blender; sensing the actual power drawn by said motor upon energization thereof and mixing of said product and solid $CO_2$; comparing said sensed power draw with said predetermined power draw level; and terminating said introduction of solid $CO_2$ when said sensed power draw reaches said predetermined power draw level, whereby said product is chilled to said selected temperature.

7. Apparatus for controlling the temperature to which a product is chilled comprising blender means having an impeller therein; electric motor means adapted to drive said impeller; signal responsive means for selectively introducing and terminating a flow of solid $CO_2$ into said blender with said impeller being effective to mix said solid $CO_2$ and said product to thereby chill the same; the improvement comprising means for sensing the value of the electrical power drawn by said motor; analyzer means for comparing said sensed power with a predetermined power value and means for supplying an electrical signal to said signal responsive means upon the value of said sensed power exceeding said predetermined power value to terminate the flow of solid $CO_2$ introduced into said blender.

* * * * *